July 12, 1966     L. W. KESTING     3,260,047

FLUID INJECTOR, SELF-COMPENSATING FOR LATERAL ACCELERATION

Filed Jan. 2, 1964     4 Sheets-Sheet 1

Lawrence W. Kesting,
*INVENTOR.*

BY Harry M. Saragovitz
Edward J. Kelly
Herbert Berl
Harold W. Hilton

Lawrence W. Kesting,
INVENTOR.

July 12, 1966  L. W. KESTING  3,260,047
FLUID INJECTOR, SELF-COMPENSATING FOR LATERAL ACCELERATION
Filed Jan. 2, 1964  4 Sheets-Sheet 4

Lawrence W. Kesting,
*INVENTOR.*

BY Harry M. Saragovitz
Edward J. Kelly
Herbert Berl
Harold W. Hilton

United States Patent Office 3,260,047
Patented July 12, 1966

3,260,047
FLUID INJECTOR, SELF-COMPENSATING FOR LATERAL ACCELERATION
Lawrence W. Kesting, Huntsville, Ala., assignor to the United States of America as represented by the Secretary of the Army
Filed Jan. 2, 1964, Ser. No. 335,446
8 Claims. (Cl. 60—35.6)

The invention described herein may be manufactured and used by or for the Government for governmental purposes without the payment of any royalty thereon.

The invention relates to an injector for use in hybrid motors. More particularly the invention relates to an injector which is displaceable responsive to lateral accelerations acting on a rocket to direct flow of an oxidizer into the central perforation of a solid propellant rocket motor in substantially equal distribution across the propellant grain to assure even and complete combustion thereof.

In the combustion of a hybrid motor, a liquid (usually the oxidizer—although in a reversed hybrid it is the fuel) is injected into the bore of a solid charge. The flow characteristics of the liquid; such as mass rate velocity, turbulence, boundary layer, thickness droplet size and distribution within the free stream and along the surface of the bore of the solid charge, must be maintained within narrow limits for maximum combustion efficiency. The efficiency drops rapidly to a premature flame out when the oxidizer spray pattern is disrupted or misdirected. A requirement exists, therefore, to maintain a near constant spray pattern relative to the solid propellant grain bores under all operating conditions.

If the rocket, and thus the combustion chamber thereof, is subjected to lateral accelerations, the free oxidizer stream will drift in the direction opposite to the acceleration thus, leaving portions of the grain bore out of the area of coverage of the injected oxidizer and also impairing the flow characteristics of the injected oxidizer.

Apparatus of the present invention includes mechanism which compensates for lateral accelerations acting on a rocket by displacing the injector head in the direction of these accelerations to maintain desired flow characteristics of an injected oxidizer and to assure substantially even distribution of the oxidizer over the propellant burning surface.

It is, therefore, an object of the present invention to provide apparatus for injection of an oxidizer in the bore of a solid propellant motor.

It is a further object of the present invention to provide apparatus for maintaining desirable flow characteristics of free flowing fluids even when such fluids are subjected to undesirable accelerations.

It is still a further object of the present invention to provide such apparatus for injection of an oxidizer in the bore of a solid propellant rocket motor and to assure substantially equal distribution of the oxidizer over the internal surface of the propellant even when the rocket is subjected to lateral accelerations.

Other objects and many attendant advantages of this invention will be readily appreciated as the same becomes better understood by reference to the following detailed description taken in conjunction with the accompanying drawings and in which.

Figure 1:
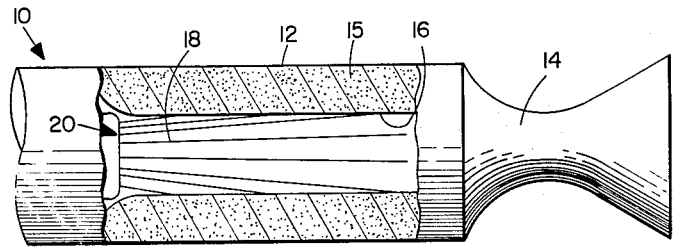
FIG. 1 is an elevational sectional view of a solid propellant rocket motor illustrating an ideal spray pattern of an oxidizer into the bore of the solid propellant.

Referring now to FIG. 1 of the drawings a rocket is generally designated by the numeral 10 and is shown to include a motor 12 having a nozzle 14. Motor 12 is shown to have an annular solid propellant grain 15 provided with an axial bore 16 therethrough. A liquid oxidizer 18 is disposed for injection into bore 16 by means of an injection apparatus 20.

It is to be understood that while the hybrid motor of the present invention is shown to have a propellant grain and a liquid oxidizer, this is for illustrative purposes only, and, if desirable, the oxidizer may be of solid composition and the fuel may be liquid. In any event, the use of either alternative is encompassed by the inventive concept of the present invention.

The apparatus of the present invention is disposed to maintain desirable flow characteristics of the injected liquid in a spray pattern approaching ideal even when the rocket is subjected to lateral accelerations.

Figure 2:
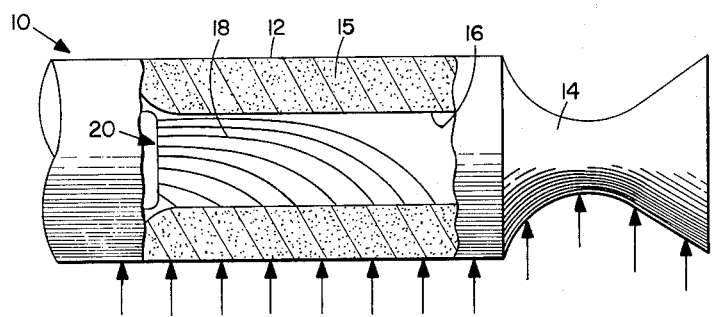
FIG. 2 is a view similar to FIG. 1 illustrating the spray pattern of a fixed face injector when the rocket is subjected to accelerations.

To this end, motor 12 is provided with injection apparatus 20 mounted at the forward end thereof. Apparatus 20 is disposed for displacement to provide a spray pattern substantially as shown in FIG. 2 when the rocket is subjected to lateral accelerations.

Figure 4:
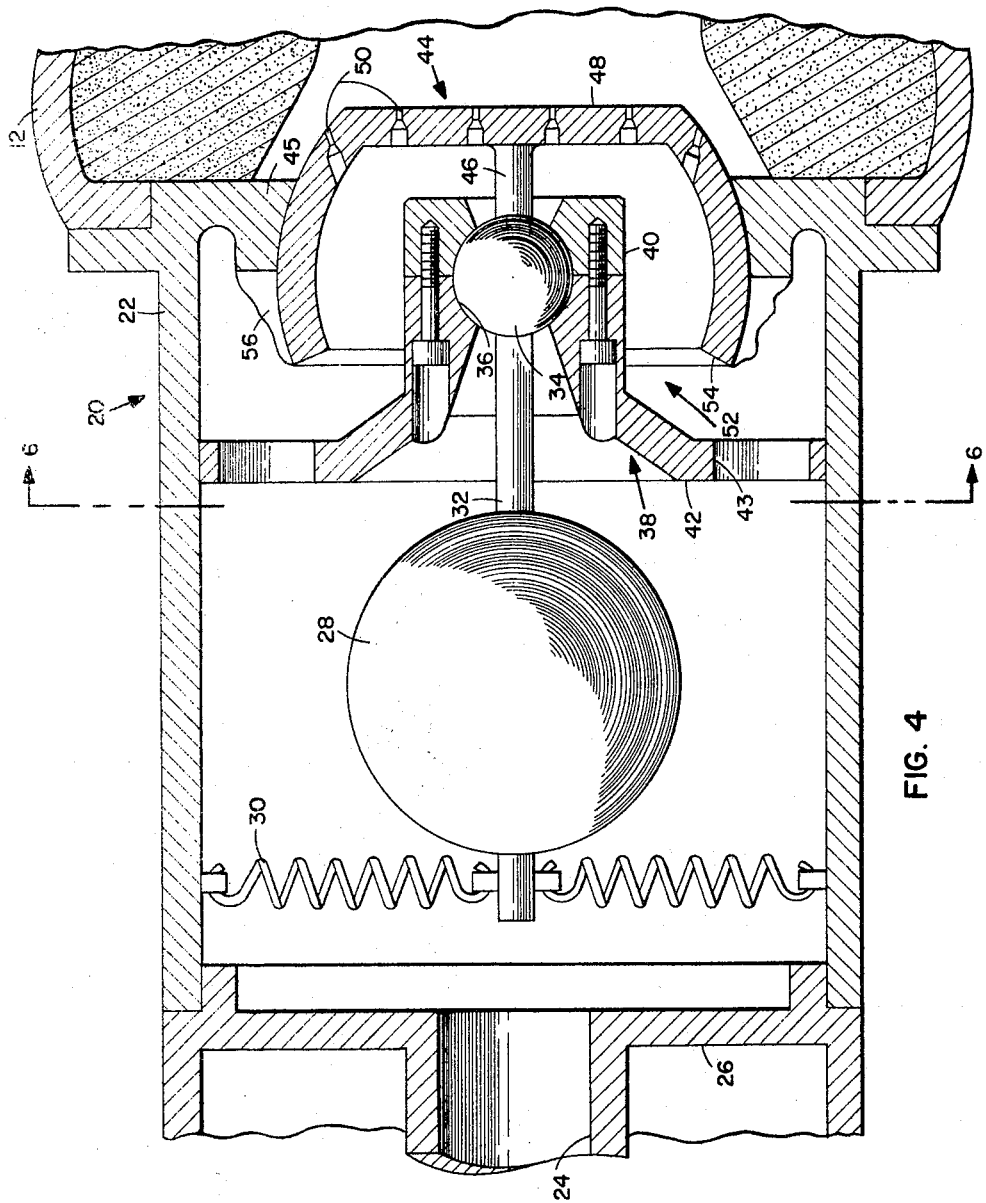
FIG. 4 is an elevational section view of the self compensating injector of the present invention.

As shown in FIG. 4, injection apparatus 20 includes a housing 22 secured to motor 12. A fluid intake orifice 24 is provided at the aft end 26 of housing 22. The injection apparatus includes a spherical balance weight 28 disposed in biased relation with the sides of housing 22 by means of 4 centering springs 30. A rod 32 is secured to balance weight 28 and extends to be secured to a spherical bearing member 34. Member 34 is supported in a spherical seat 36 provided in an internal support member 38. Member 38 includes a projecting annular portion 40 having seat 36 therein and a circular back plate 42 provided with a plurality of radially disposed apertures 43 disposed for flow of the oxidizer therethrough.

An injector head 44 is concentrically disposed about annular portion 40 for movement in an annular shoulder 45 of housing 22. Head 44 is in secured relation with bearing member 34 by means of a threaded rod 46. Head 44 is provided at the forward end 48 with a plurality of apertures 50 which is disposed in communication with bore 16 of motor 12. The aft end 52 of head 44 is provided with an annular opening 54. A flexible seal 56 is secured to the aft end 52 of head 44 and to shoulder 45 to prevent seepage of the oxidizer between the shoulder and injector head.

In operation, the oxidizer is supplied, under pressure, to intake orifice 24 for flow into housing 22, through apertures 43 of support member 38, opening 54 of head 44 and apertures 50 of head 44 and into bore 16 of motor 12 for substantially equal distribution across propellant grain 14.

With no lateral accelerations acting on rocket 10 the spray configuration would be similar to that illustrated in FIG. 1. However, when the missile is subjected to accelerations the spray tends to assume the configuration as illustrated in FIG. 2. To compensate for the accelerations, the apparatus assumes the position illustrated in FIGS. 3 and 5.

Figure 3:
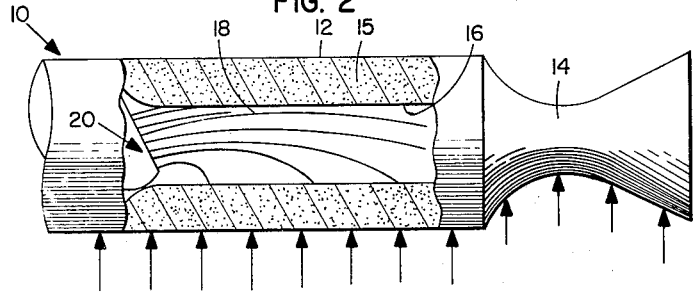
FIG. 3 is a view similar to FIG. 2 illustrating the spray pattern of the moveable injector of the present invention.
Figure 5:
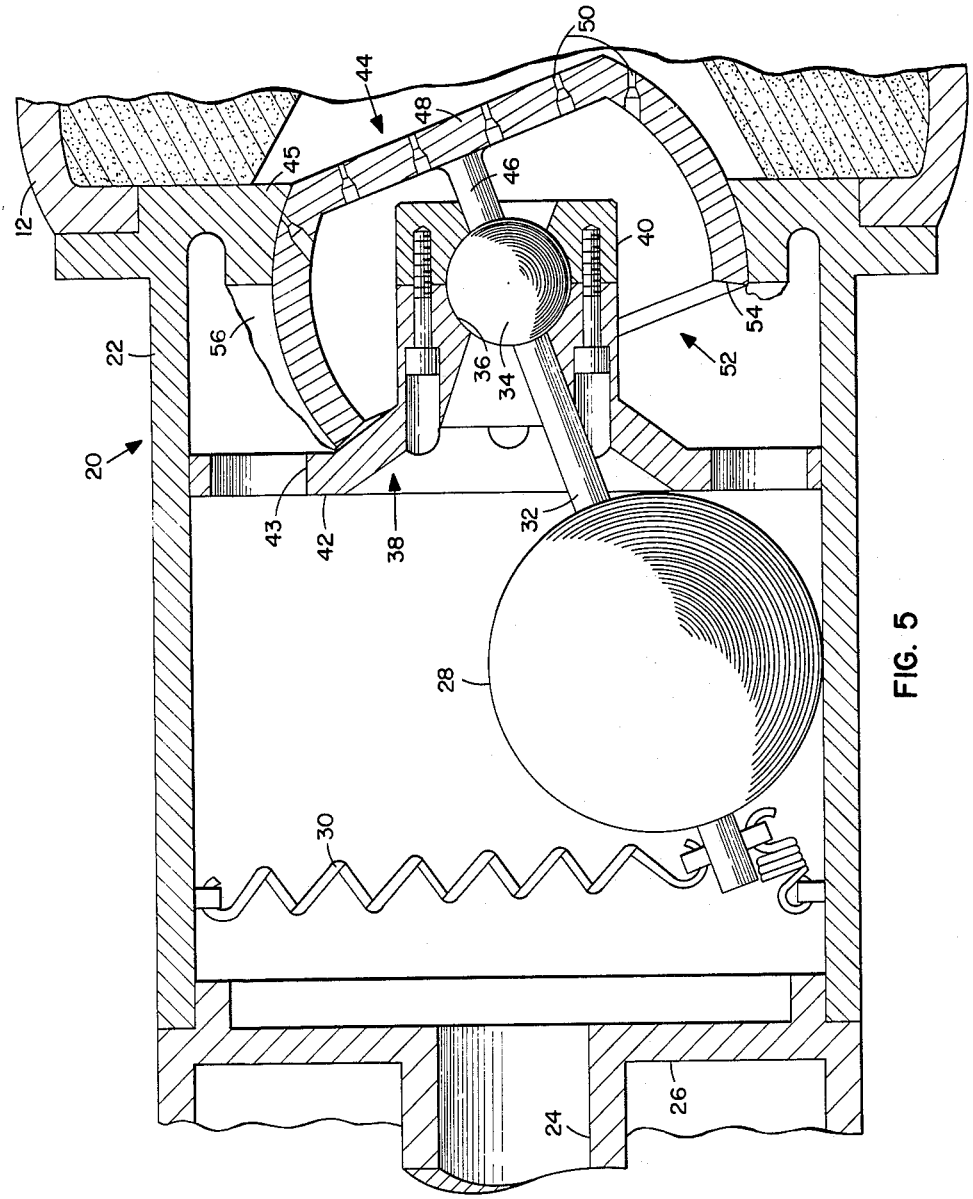
FIG. 5 is a view similar to FIG. 4 illustrating the self compensating action of the device of the present invention when the device is subjected to lateral accelerations.
Figure 6:
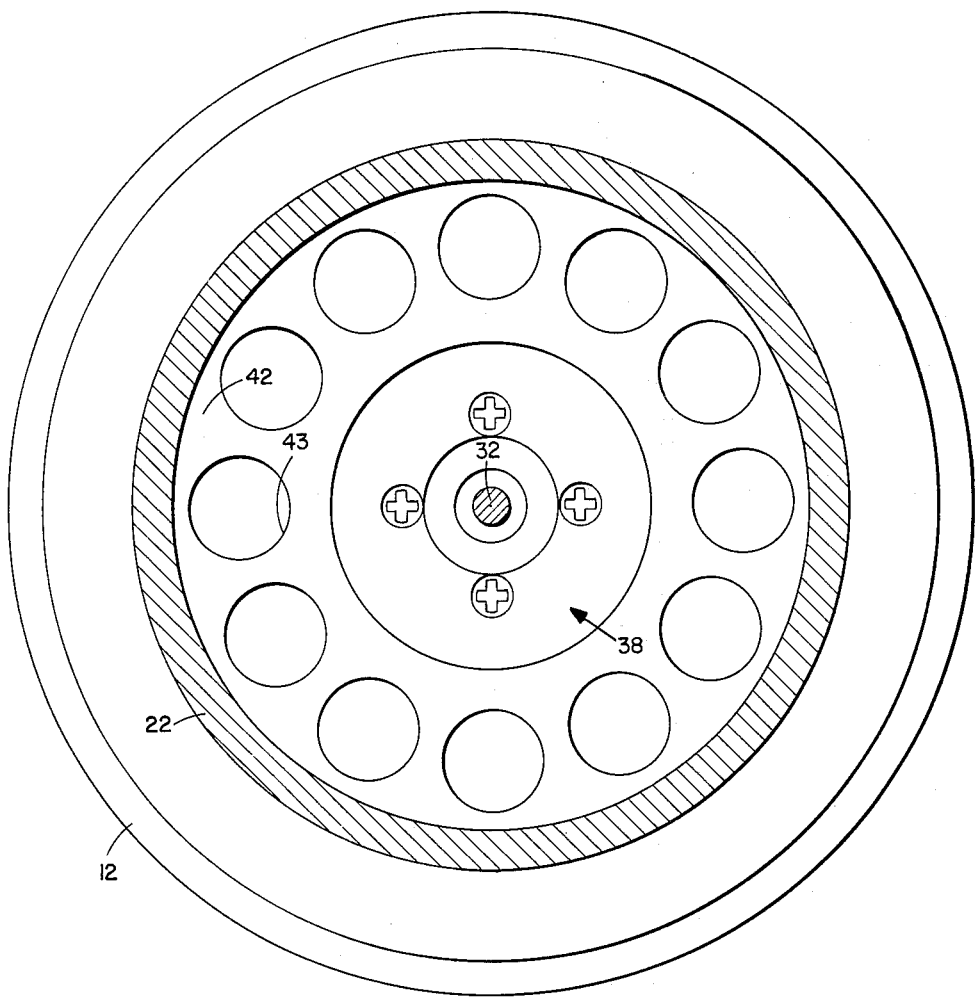
FIG. 6 is a view along line 6—6 of FIG. 4.

As shown in FIG. 5, missile or rocket 12 is shown to be under the influence of lateral accelerations. Such accelerations displaces spherical balance 28 in the opposite direction of the accelerations, against the restraining action of springs 30. Due to the rigid connection between weight 28 and bearing member 34, the bearing member 34 is forced to rotate in seat 36 and since head 44 is rigidly connected to member 34, head 44 is made to pivot thereabout, in the direction of the accelerations. With the oxidizer flowing into housing 22 through the intake orifice 24 and out of apertures 50 of head 44, the injectant spray assumes the configuration as illustrated in FIG. 3 in which substantially equal distribution of the oxidizer occurs across the propellant grain. Once the accelerations cease to exist the apparatus is returned to a balanced condition by virtue of springs 30 urging the apparatus back to the balanced condition.

While the self compensating injector apparatus has been described herein in conjunction with hybrid rocket motors it is to be understood that the principle of the invention may be extended to be included in many control devices utilizing free jets of fluids. For example, fluid amplifiers utilize a free jet which is deflected to various receiving channels. Certain types of accelerometers are based upon a conductive free flowing stream. These devices when mounted upon a carrier which is rotated or maneuvered, could be subjected to lateral accelerations relative to the free fluid path that would impair their performance. The injector of the present invention will self-compensate for this alteration.

Obviously many modifications and variations of the present invention are possible in light of the above teachings. It is, therefore, to be understood that within the scope of the appended claims the invention may be practiced otherwise than as specifically described.

I claim:
1. In a rocket having a solid propellant motor provided with a central passageway; an oxidizer disposed for injection into said passageway for substantially equal distribution across the grain of said propellant to sustain ignition thereof; injection means mounted in said rocket in biased relation thereto and disposed for tilting responsive to lateral accelerations acting on said rocket to inject said oxidizer into said passageway for substantial equal distribution across said propellant.

2. Apparatus as in claim 1 wherein said injection means includes an element moveable by inertia in the opposite direction of the accelerations to tilt said injection means in the direction of the accelerations to effect the substantially equal distribution of said oxidizer across said propellant.

3. Apparatus as in claim 2 wherein said injection means includes a housing secured to the aft end of said rocket motor; said element mounted in said housing in biased relation thereto; an injector head provided with apertures disposed in communication with said oxidizer and said passageway, said head being rigidly secured to said element for movement thereby responsive to the accelerations to substantially evenly distribute said oxidizer across said propellant responsive to the accelerations.

4. Apparatus as in claim 3 including an internal support member secured in said housing and provided with a plurality of radially disposed apertures for passage of oxidizer therethrough and a bore centrally disposed therein; a bearing mounted in said bore; means rigidly attaching said bearing to said element; means rigidly securing said head to said bearing for the tilting relationship responsive to the accelerations.

5. Apparatus as in claim 4 wherein said internal support member includes a projecting annular portion provided with said aperture to receive said bearing therein; said head mounted on said annular portion in concentric relation thereto.

6. Apparatus as in claim 5 including a flexible sealing member secured in said housing in circumferential relation with said head.

7. Apparatus as in claim 6 wherein said element is a spherical balance weight.

8. Apparatus as in claim 7 including a plurality of springs secured to said spherical balance weight and said housing to bias said weight in balanced relation subsequent to said rocket being subjected to said accelerations.

References Cited by the Examiner

UNITED STATES PATENTS 2,637,273   5/1953   Stokes et al. _____ 60—39.28
3,128,599   4/1964   Carr _____ 60—35.6

MARK NEWMAN, *Primary Examiner.*

SAMUEL FEINBERG, *Examiner.*